United States Patent
Suzuki et al.

(10) Patent No.: US 9,221,462 B2
(45) Date of Patent: Dec. 29, 2015

(54) VEHICLE BEHAVIOR STABILITY CONTROL APPARATUS

(71) Applicant: HONDA MOTOR CO., LTD., Tokyo (JP)

(72) Inventors: Noriaki Suzuki, Wako (JP); Hideharu Murano, Wako (JP); Ryota Yasuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 18 days.

(21) Appl. No.: 14/075,173

(22) Filed: Nov. 8, 2013

(65) Prior Publication Data
US 2014/0136014 A1 May 15, 2014

(30) Foreign Application Priority Data
Nov. 9, 2012 (JP) ................. 2012-247763

(51) Int. Cl.
| | |
|---|---|
| *B60W 10/04* | (2006.01) |
| *B60W 30/02* | (2012.01) |
| *B60W 10/06* | (2006.01) |
| *B60W 10/08* | (2006.01) |
| *B60W 10/184* | (2012.01) |
| *B60W 30/18* | (2012.01) |
| *B60W 20/00* | (2006.01) |

(52) U.S. Cl.
CPC ............. *B60W 30/02* (2013.01); *B60W 10/04* (2013.01); *B60W 10/06* (2013.01); *B60W 10/08* (2013.01); *B60W 10/184* (2013.01); *B60W 20/1062* (2013.01); *B60W 30/18136* (2013.01); *B60W 2520/10* (2013.01); *B60W 2520/125* (2013.01); *B60W 2520/14* (2013.01); *B60W 2540/18* (2013.01); *B60W 2710/0644* (2013.01); *B60W 2710/0677* (2013.01); *B60W 2710/086* (2013.01); *B60W 2710/182* (2013.01); *B60W 2720/14* (2013.01); *Y02T 10/6286* (2013.01); *Y02T 10/7258* (2013.01)

(58) Field of Classification Search
None
See application file for complete search history.

(56) References Cited

U.S. PATENT DOCUMENTS

| | | | |
|---|---|---|---|
| 7,739,011 B2 | 6/2010 | Takahashi et al. | |
| 2006/0091727 A1* | 5/2006 | Motoyama | 303/189 |
| 2006/0197377 A1 | 9/2006 | Takahashi et al. | |

(Continued)

FOREIGN PATENT DOCUMENTS

| | | |
|---|---|---|
| JP | 11-070865 A | 3/1999 |
| JP | 2006-240496 A | 9/2006 |

*Primary Examiner* — John R Olszewski
*Assistant Examiner* — Jess Whittington
(74) *Attorney, Agent, or Firm* — Westerman, Hattori, Daniels & Adrian, LLP

(57) ABSTRACT

A vehicle behavior stability control apparatus includes a yaw rate sensor, a lateral acceleration sensor, a vehicle speed sensor, an urgency determining section, a target yaw rate setting section, and an actuator control section. If the urgency determining section determines that an urgency with which a vehicle behavior is to be stabilized is equal to or lower than a determination criterion that indicates a necessity to stabilize the vehicle behavior urgently, the target yaw rate setting section sets, as a target yaw rate, a right-left cooperative target yaw rate that is commonly applied to both right cornering and left cornering. Otherwise, if the urgency determining section determines that the urgency exceeds the determination criterion, the target yaw rate setting section sets, as a target yaw rate, right-left independent target yaw rates that are independently applied to the right cornering and left cornering, respectively.

8 Claims, 4 Drawing Sheets

(56) References Cited

U.S. PATENT DOCUMENTS

| | | | |
|---|---|---|---|
| 2007/0273204 A1* | 11/2007 | Kodama et al. | 303/146 |
| 2008/0306658 A1* | 12/2008 | Beisheim et al. | 701/46 |
| 2009/0164068 A1* | 6/2009 | Tamai | 701/42 |
| 2012/0109464 A1* | 5/2012 | Mizutani et al. | 701/42 |
| 2012/0143399 A1* | 6/2012 | Noumura et al. | 701/1 |
| 2012/0173040 A1* | 7/2012 | Yokota | 701/1 |
| 2012/0179349 A1* | 7/2012 | Yamakado et al. | 701/89 |

* cited by examiner

VEHICLE BEHAVIOR STABILITY CONTROL APPARATUS

CROSS REFERENCES TO RELATED APPLICATIONS

The present application claims priority under 35 U.S.C. §119 to Japanese Patent Application No. 2012-247763, filed Nov. 9, 2012, entitled "Vehicle Behavior Stability Control Apparatus." The contents of this application are incorporated herein by reference in their entirety.

TECHNICAL FIELD

The present disclosure relates to a vehicle behavior stability control apparatus that stabilizes a vehicle behavior.

BACKGROUND

A technique for stabilizing a vehicle behavior by controlling the actuator that can adjust the motion state of the vehicle in such a way that an actual yaw rate tracks a target yaw rate has become a known art (for example, refer to Japanese Unexamined Patent Application Publication No. 11-70865).

In the above technique, a critical lateral acceleration is estimated on the basis of a fact that the absolute value of a lateral acceleration corresponds to a friction factor of a road surface, and a revolution angular velocity determined from an equation (lateral acceleration/vehicle speed) is set as a control-target yaw rate that is commonly applied to both the right and left turning directions. Even if a driver performs a steering operation, an over-steer control does not start until the yaw rate exceeds the revolution angular velocity on the opposite side of the steering direction. Accordingly, when the driver performs an abrupt and quick steering operation with large steering angle so that the phase difference occurs between the yaw rate and the lateral acceleration, there are cases where the over steer control does not start even when the yaw rate (rotation velocity) is considerably larger than the locus angle rate (revolution angular velocity) of the vehicle. In this case, the vehicle behavior is difficult to stabilize.

Japanese Unexamined Patent Application Publication No. 2006-240496 proposes another technique for stabilizing a vehicle behavior in which critical road surface yaw rates are independently determined for the right and left sides, respectively, in accordance with the respective peaks of the lateral accelerations based on the right and left turnings. This technique can control the vehicle to start the over steer control at the earlier timing, when the driver performs an abrupt and quick steering operation with large steering angle so that the phase difference occurs between the yaw rate and the lateral acceleration. As a result, the vehicle behavior can be stabilized swiftly.

SUMMARY

With above technique, the over steer control starts at early timing, every time the turning direction changes. However, this scheme may cause the driver to have an unnatural feeling in a normal state.

It is desirable to provide a vehicle behavior stability control apparatus that can suppress an unnatural feeling that a driver has in a normal state and stabilize the vehicle behavior in an urgent state.

According to a first aspect of the embodiment, there is provided a vehicle behavior stability control apparatus including: an actual yaw rate detecting section that detects an actual yaw rate of a vehicle; a lateral acceleration detecting section that detects a lateral acceleration of the vehicle; and a vehicle speed detecting section that detects a speed of the vehicle. An urgency determining section determines an urgency with which a behavior of the vehicle is to be stabilized, on the basis of a driving state of the vehicle, the driving state including the actual yaw rate and the lateral acceleration. A target yaw rate setting section sets a target yaw rate on the basis of the lateral acceleration detected by the lateral acceleration detecting section and the vehicle speed detected by the vehicle speed detecting section. A control section controls an actuator in such a way that the actual yaw rate detected by the actual yaw rate detecting section tracks the target yaw rate set by the target yaw rate setting section, the actuator being capable of adjusting a motion state of the vehicle. If the urgency determining section determines that the urgency with which the behavior of the vehicle is to be stabilized is equal to or lower than a determination criterion, the target yaw rate setting section sets a right-left cooperative target yaw rate as the target yaw rate, the determination criterion indicating a necessity to stabilize the behavior of the vehicle urgently, the right-left cooperative target yaw rate being commonly applied to both right cornering and left cornering. Otherwise, if the urgency determining section determines that the urgency with which the behavior of the vehicle is to be stabilized exceeds the determination criterion, the target yaw rate setting section sets right-left independent target yaw rates as the target yaw rate, the right-left independent target yaw rates being independently applied to the right cornering and left cornering, respectively.

In a normal state in which the urgency with which a vehicle behavior is to be stabilized is low (or equal to or lower than the determination criterion), the first aspect controls an actuator smoothly by setting a right-left cooperative target yaw rate that is commonly applied to both the right cornering and left cornering, thereby suppressing a driver's unnatural feeling. In contrast, in an urgent state in which the urgency with which the vehicle behavior to be stabilized is high, the first aspect controls the actuator speedily by setting the right-left independent target yaw rates that are independently applied to the right cornering and left cornering, respectively, thereby stabilizing the vehicle behavior swiftly.

The above first aspect can suppress an unnatural feeling that a driver has in a normal state and stabilize a vehicle behavior in an urgent state.

According to a second aspect, in addition to the first aspect, the target yaw rate setting section may determine both the right-left cooperative target yaw rate and the right-left independent target yaw rates in preparation for the setting, independently of a result of determining the urgency with which the vehicle behavior is stabilized.

The second aspect enables the control modes of an actuator to be switched swiftly, even when the urgency with which a vehicle behavior to be stabilized fluctuates rapidly.

According to a third aspect, in addition to the first or second aspect, the driving state may include a steering angular velocity of a steering system, and if the steering angular velocity of the steering system is equal to or higher than a predetermined threshold and the control of the actuator is in execution, the urgency determining section may determine that the urgency with which the vehicle behavior is to be stabilized exceeds the determination criterion.

The third aspect enables the stability of a vehicle behavior to be controlled at appropriate timing.

According to a fourth aspect, in addition to one of the first to third aspects, the right-left cooperative target yaw rate and the right-left independent target yaw rates each may have a dead zone, and the dead zone of each of the right-left independent target yaw rates may be narrower than the dead zone of the right-left cooperative target yaw rate.

The fourth aspect enables an actuator to be controlled swiftly, when the urgency with which a vehicle behavior is to be stabilized becomes high.

According to a fifth aspect, an amount of controlling the actuator may be larger in a first case than in a second case. The first case is a case in which the right-left cooperative target yaw rate is switched to either of the right-left independent target yaw rates when the urgency varies from equal to or lower than the determination criterion to higher than the determination criterion. The second case is a case in which either of the right-left independent target yaw rates is switched to the right-left cooperative target yaw rate when the urgency varies from higher than the determination criterion to equal to or lower than the determination criterion.

The fifth aspect enables an actuator to be controlled dynamically, when the right-left cooperative target yaw rate is switched to either of the right-left independent target yaw rates.

According to a sixth aspect, a controlling speed at which the actuator is controlled may be faster in a third case than in a fourth case. The third case is a case in which the right-left cooperative target yaw rate is switched to either of the right-left independent target yaw rates when the urgency varies from equal to or lower than the determination criterion to higher than the determination criterion. The fourth case is a case in which either of the right-left independent target yaw rates is switched to the right-left cooperative target yaw rate when the urgency varies from higher than the determination criterion to equal to or lower than the determination criterion.

The sixth aspect enables an actuator to be controlled swiftly, when the right-left cooperative target yaw rate is switched to either of the right-left independent target yaw rates.

BRIEF DESCRIPTION OF THE DRAWINGS

The advantages of the disclosure will become apparent in the following description taken in conjunction with the following drawings.

DETAILED DESCRIPTION

Hereinafter, a vehicle behavior stability control apparatus 11 according to this embodiment will be described in detail with reference to the accompanying drawings.

[Configuration of Vehicle Behavior Stability Control Apparatus 11]

Figure 1:
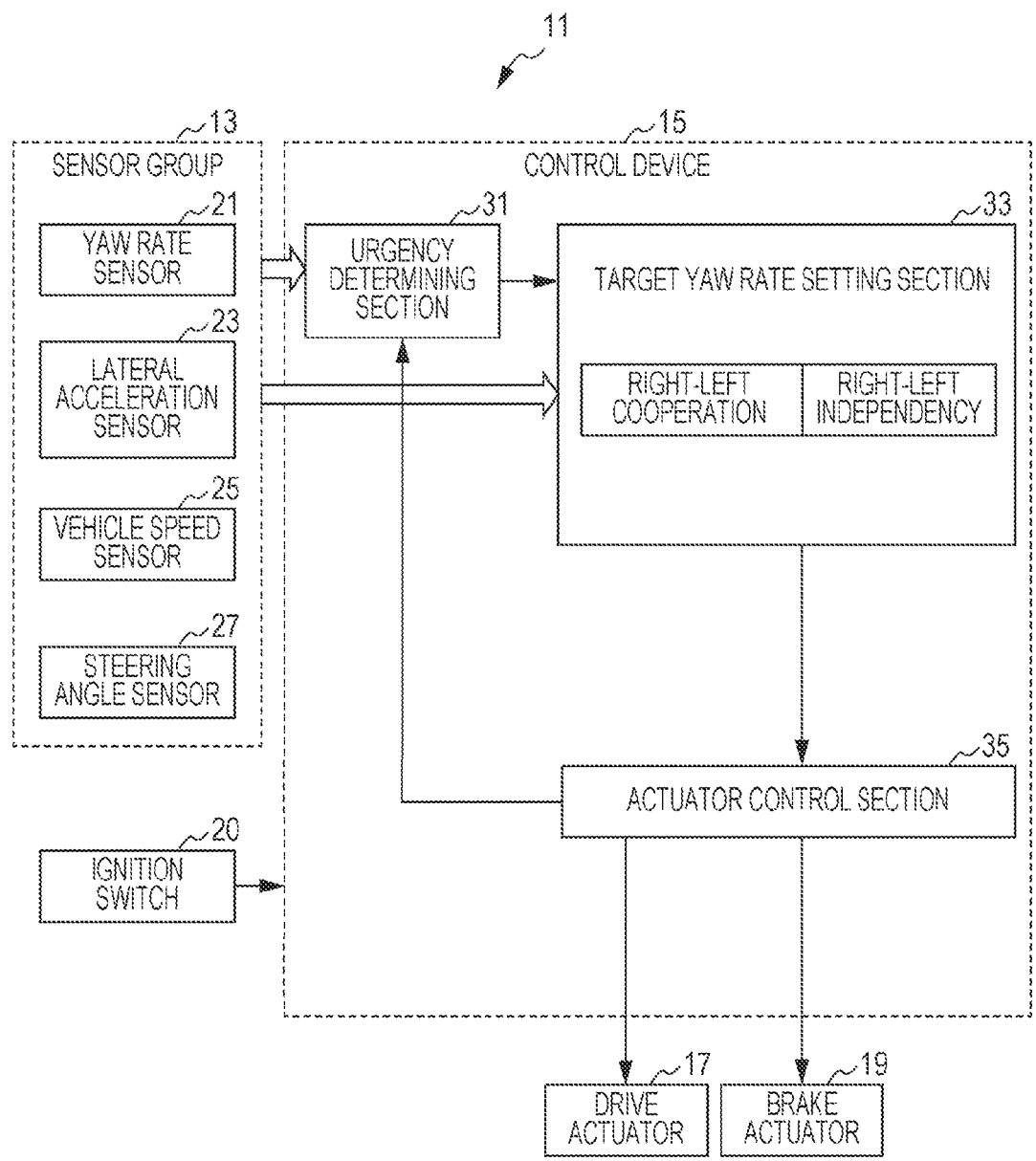
FIG. 1 is a block diagram showing a function of a vehicle behavior stability control apparatus according to an embodiment.

A configuration of the vehicle behavior stability control apparatus 11 will be described with reference to FIG. 1. FIG. 1 is a block diagram showing a function of the vehicle behavior stability control apparatus 11.

As shown in FIG. 1, the vehicle behavior stability control apparatus 11 includes a sensor group 13, a control device 15, a drive actuator 17, a brake actuator 19, and an ignition switch 20.

As shown in FIG. 1, the sensor group 13 includes a yaw rate sensor 21, a lateral acceleration sensor 23, a vehicle speed sensor 25, and a steering angle sensor 27.

The yaw rate sensor 21 has a function of detecting an actual yaw rate of a vehicle (not shown) (or a rate at which an angular velocity of the vehicle changes in a turning direction). Herein, the yaw rate sensor 21 corresponds to an "actual yaw rate detecting section."

The lateral acceleration sensor 23 has a function of detecting acceleration (lateral acceleration) generated by the vehicle in the lateral direction when the vehicle runs in a curve. Herein, the lateral acceleration sensor 23 corresponds to a "lateral acceleration detecting section."

The vehicle speed sensor 25 has a function of detecting a speed of the vehicle (hereinafter, referred to as a "vehicle speed."). Herein, the vehicle speed sensor 25 corresponds to a "vehicle speed detecting section."

The steering angle sensor 27 has a function of detecting a steering angle of the front wheels (not shown) of the vehicle. Also, the steering angle sensor 27 further has a function of determining a steering angular velocity of a steering system (not shown) by temporally differentiating the detected steering angle, and outputting the determined steering angular velocity. Instead of the steering angle sensor 27, the control device 15, which will be described below, may have the function of determining and outputting the steering angular velocity of the steering system. In this case, it is only necessary to equip the steering angle sensor 27 with the function of detecting the steering angle of the front wheels.

The control device 15 is built into, for example, an engine control unit (ECU), and includes an urgency determining section 31, a target yaw rate setting section 33, and an actuator control section 35, as shown in FIG. 1. The control device 15 is configured with a microcomputer including a central processing unit (CPU), a read only memory (ROM), and a random access memory (RAM), all of which are not shown. This microcomputer reads a program from the ROM, and executes it, thereby operating so as to perform and control various functions of the control device 15, including an urgency determining function, a target yaw rate setting function, and an actuator control function (or a vehicle behavior stability control function).

The urgency determining section 31 has a function of determining an urgency with which a vehicle behavior is to be stabilized, on the basis of the driving state of the vehicle, such as an actual yaw rate and a lateral acceleration. Herein, the term "an urgency with which a vehicle behavior is to be stabilized" refers to an index representing an urgency with which a vehicle has to stabilize its behavior. In more detail, for example, the urgency determining section 31 compares the urgency with which the vehicle behavior is to be stabilized with a preset determination criterion (that will be described below in detail) which indicates the necessity to stabilize a vehicle behavior urgently. Then, if the urgency exceeds the determination criterion, the urgency determining section 31 determines that the urgency with which the vehicle behavior is to be stabilized is high.

The target yaw rate setting section 33 has a function of setting a target yaw rate, on the basis of a lateral acceleration detected by the lateral acceleration sensor 23 and a vehicle speed detected by the vehicle speed sensor 25 and through an equation (lateral acceleration/vehicle speed). Herein, the term "target yaw rate" refers to a state amount that becomes a reference used to stabilize a vehicle behavior.

In the vehicle behavior stability control apparatus 11, the target yaw rate setting section 33 sets a right-left cooperative target yaw rate or right-left independent target yaw rates (both of which will be described below) as a target yaw rate, depending on the urgency with which the vehicle behavior is to be stabilized.

In more detail, if the urgency determining section 31 determines that the urgency with which the vehicle behavior is to be stabilized is equal to or lower than the above determination criterion, the target yaw rate setting section 33 sets the right-left cooperative target yaw rate that is commonly applied to both the right cornering and left cornering. Herein, the "right-left cooperative target yaw rate" corresponds to a target yaw rate that is set to either of the right and left turning directions of a vehicle and that is commonly set in cooperation with a direction opposite to the turning direction.

A method of setting the "right-left cooperative target yaw rate" may employ a method described in Japanese Unexamined Patent Application Publication No. 11-70865, the entire contents of which are incorporated herein by reference. More specifically, a critical lateral acceleration is estimated on the basis of a fact that the absolute value of a lateral acceleration corresponds to a friction factor of a road surface, and a revolution angular velocity determined from an equation (lateral acceleration/vehicle speed) is set as the "right-left cooperative target yaw rate" that is commonly applied to both the right cornering and left cornering. This method of setting the "right-left cooperative target yaw rate" may further employ a method of setting a target yaw rate by using absolute-value or peak hold process.

If the urgency determining section 31 determines that the urgency with which the vehicle behavior is to be stabilized exceeds the above determination criterion, the target yaw rate setting section 33 sets the right-left independent target yaw rates that are independently applied to the right cornering and left cornering, respectively. Herein, the "right-left independent target yaw rates" correspond to a target yaw rate that is set for each of the right cornering and left cornering when different target yaw rates are independently set to the right cornering and left cornering of a vehicle, respectively.

The "right-left independent target yaw rates" are disclosed in, for example, Japanese Unexamined Patent Application Publication No. 2006-240496 and United States Patent Application Publication No. 2006/0197377 (critical road surface yaw rates are independently determined for the right and left sides, respectively, in accordance with the respective peaks of the lateral accelerations based on the right and left turnings). The entire contents of which are incorporated herein by reference.

Next, the determination criterion will be described. The term "determination criterion" is an index that becomes a reference used to determine the necessity to stabilize a vehicle behavior urgently. More specifically, for example, if a steering angular velocity of the steering system is equal to or higher than a predetermined threshold and the control of an "actuator" (e.g. the drive actuator 17 and the brake actuator 19 herein) is in execution, the urgency determining section 31 determines that the urgency with which the vehicle behavior is to be stabilized exceeds the "determination criterion."

The case where a steering angular velocity is equal to or higher than a predetermined threshold and the control of the "actuator" (e.g. the drive actuator 17 and the brake actuator 19) is in execution corresponds to, for example, a case where a driver performs an abrupt steering operation while driving a vehicle with the control of its stability being in execution. In this case, it is obvious that the urgency with which the vehicle behavior is to be stabilized becomes high, because the driver performs the abrupt steering operation. Employing this "determination criterion" enables the actuator control section 35 to control the stability of the vehicle behavior at appropriate timing.

The actuator control section 35, which corresponds to a "control section" herein, has a function of controlling driving power that allows the vehicle to run. The actuator control section 35 is connected to the drive actuator 17 that operates mechanical elements for supplying the vehicle with driving force. The actuator control section 35 operates so as to control the operation of the drive actuator 17 that can adjust the motion state of the vehicle, in such a way that an actual yaw rate detected by the yaw rate sensor 21 tracks a target yaw rate (the right-left cooperative target yaw rate or the right-left independent target yaw rates) set by the target yaw rate setting section 33. Furthermore, the actuator control section 35 sends the urgency determining section 31 a message that the operational control of the drive actuator 17 is in execution.

Examples of the mechanical elements for supplying a vehicle with driving force include throttle and inlet valves (both of which are not shown) that controls an amount of air which an engine (not shown) inhales. By adjusting either or both of the opening of the throttle valve and the lift of the inlet valve, the actuator control section 35 can control an amount of air which the engine inhales, or the driving power of the engine.

In the case where the vehicle utilizes the driving power of the engine as well as the driving power of the motor, like a hybrid car, the motor may be one of the mechanical elements. In this case, the actuator control section 35 can control the driving power of the engine by adjusting the rotational speed of the motor.

The expression "an actual yaw rate tracks a target yaw rate" means that, for example, a difference between the actual yaw rate and the target yaw rate falls within a predetermined variable range (e.g. ±1 deg/s).

The actuator control section 35 further has a function of controlling braking power that allows the running vehicle to stop. The actuator control section 35 is connected to the brake actuator 19 that operates mechanical elements for supplying the vehicle with braking power. The actuator control section 35 operates so as to control the operation of the brake actuator 19 in such a way that an actual yaw rate detected by the yaw rate sensor 21 tracks a target yaw rate (the right-left cooperative target yaw rate or the right-left independent target yaw rates) set by the target yaw rate setting section 33. Furthermore, the actuator control section 35 sends the urgency determining section 31 a message that the operational control of the brake actuator 19 is in execution.

Examples of the mechanical elements for supplying a vehicle with braking power include a hydraulic brake device and an electric parking brake (both of which are not shown). By adjusting either or both of the oil pressure of the hydraulic brake device and the ON/OFF of the electric parking brake, the actuator control section 35 can control the braking power of the vehicle.

The actuator control section 35 may control an engine brake (when the vehicle is equipped with an internal-combustion engine as a driving source) or a regenerative brake (when the vehicle is equipped with a motor as a driving source). In this case, the actuator control section 35 may control the engine brake by causing the brake actuator 19 to adjust either or both of the opening of the throttle valve and the lift of the inlet valve. In addition, the actuator control section 35 may control the regenerative brake by causing the brake actuator 19 to adjust the rotational speed of the motor.

The actuator control section 35 may be configured with a vehicle stability assist device that supports the stabilization of a vehicle behavior.

The ignition switch 20 is connected to the control device 15. If the ignition switch 20 is turned off while the control device 15 is performing the vehicle behavior stability control, the control device 15 operates so as to interrupt this vehicle behavior stability control.

The vehicle behavior stability control apparatus 11 configured above is equipped with an operation switch (not shown) used to selectively set the vehicle behavior stability control function to the enable or the disable mode. Hereinafter, the following description will be given on the premise that the operation switch sets the vehicle behavior stability control function to the enable mode, unless otherwise stated.

[Primary Operation of Vehicle Behavior Stability Control Apparatus 11]

Figure 2:
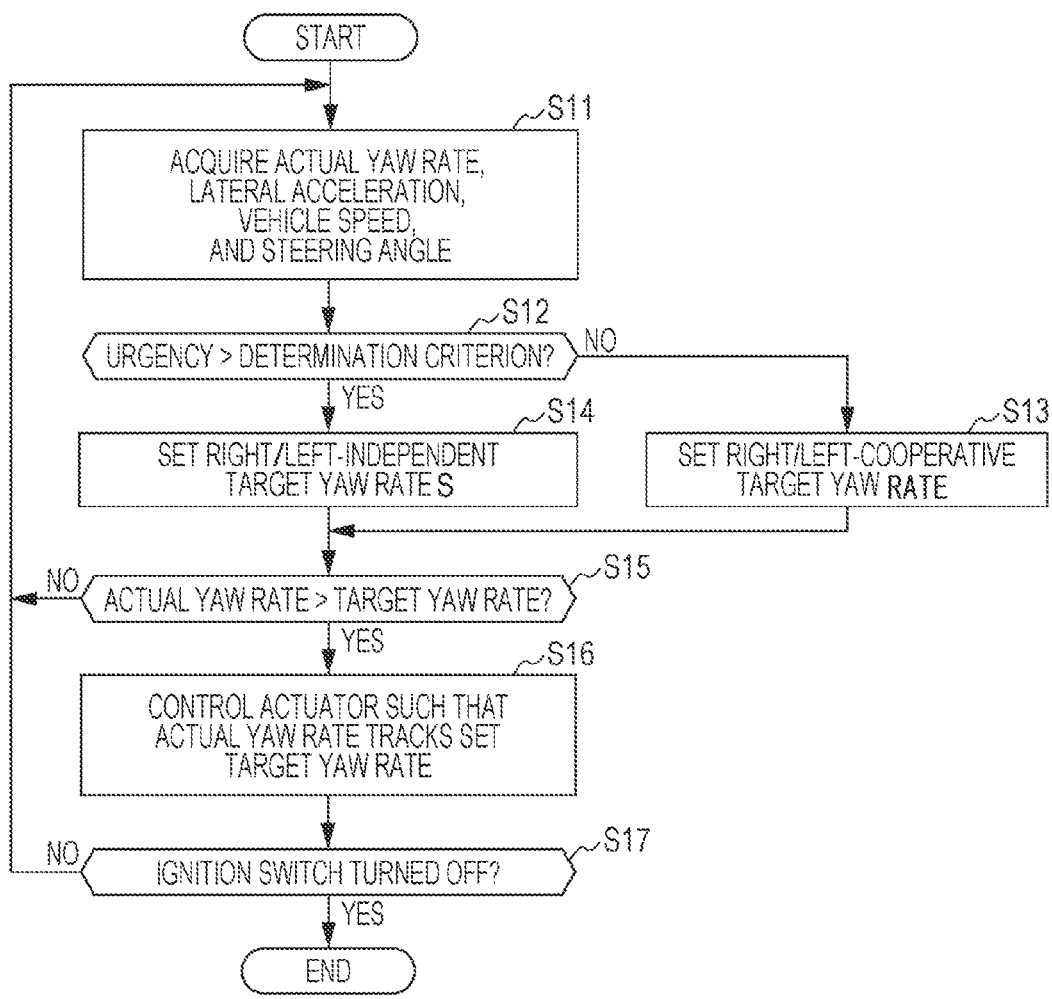
FIG. 2 is a flowchart of an operation of the vehicle behavior stability control apparatus according to the embodiment.

A primary operation of the vehicle behavior stability control apparatus 11 will be described with reference to FIG. 2. FIG. 2 is a flowchart of a running control process performed by the vehicle behavior stability control apparatus 11.

At Step S11, the control device 15 acquires various pieces of data from the sensor group 13, including an actual yaw rate detected by the yaw rate sensor 21, a lateral acceleration detected by the lateral acceleration sensor 23, a vehicle speed detected by the vehicle speed sensor 25, and a steering angle (including a steering angular velocity) detected by the steering angle sensor 27.

At Step S12, the urgency determining section 31 determines whether or not an urgency with which a vehicle behavior is to be stabilized exceeds a "determination criterion." In more detail, if the steering angular velocity of the steering system is equal to or higher than a predetermined threshold and the control of an "actuator" (e.g. the drive actuator 17 and the brake actuator 19 herein) is in execution, the urgency determining section 31 determines that the urgency with which the vehicle behavior is to be stabilized exceeds the "determination criterion." Otherwise, if the steering angular velocity is lower than the predetermined threshold or the control of the "actuator" (e.g. the drive actuator 17 and the brake actuator 19) is not in execution, the urgency determining section 31 determines that the urgency with which the vehicle behavior is to be stabilized is equal to or lower than the "determination criterion."

If the urgency with which the vehicle behavior is to be stabilized is determined to be equal to or lower than the "determination criterion" as the result of determining the urgency at Step S12 (see "No" at Step S12), the target yaw rate setting section 33 sets, as a target yaw rate, a right-left cooperative target yaw rate that is commonly applied to both the right cornering and left cornering of the vehicle, at Step S13.

Otherwise, if the urgency with which the vehicle behavior is to be stabilized is determined to exceed the "determination criterion" as the result of determining the urgency at Step S12 (see "Yes" at Step S12), the target yaw rate setting section 33 sets, as a target yaw rate, right-left independent target yaw rates that are independently applied to the right cornering and left cornering, respectively, of the vehicle at Step S14.

At Step S15, the control device 15 determines whether or not the actual yaw rate exceeds the target yaw rate set at Step S13 or Step S14.

If the actual yaw rate is determined not to exceed the target yaw rate as the determination result at Step S15 (see "No" at Step S15), the control device 15 returns the current process flow to Step S11, and sequentially performs the above processes.

Otherwise, if the actual yaw rate is determined to exceed the target yaw rate as the determination result at Step S15 (see "Yes" at Step S15), the actuator control section 35 controls the respective operations of the drive actuator 17 and the brake actuator 19 in such a way that the actual yaw rate tracks the target yaw rate (the right-left cooperative target yaw rate or the right-left independent target yaw rates) set by the target yaw rate setting section 33, at Step S16. In the operational control at Step S16, either or both of the driving power and braking power may be controlled.

At Step S17, the control device 15 checks whether or not the ignition switch 20 is turned off. If the ignition switch 20 is not turned off as the check result at Step S17 (see "No" at Step S17), the control device 15 returns the current process flow to Step S11, and sequentially performs the above processes.

Otherwise, if the ignition switch 20 is turned off as the check result at Step S17 (see "Yes" at Step S17), the control device 15 terminates a series of processes in the vehicle behavior stability control.

[Function and Effect of Vehicle Behavior Stability Control Apparatus 11]

Figure 3A:
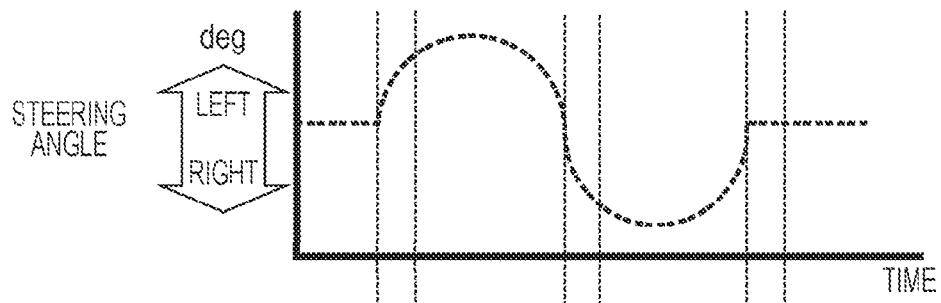
FIG. 3A is a graph showing a variation in a steering angle over time when a steering operation is sequentially performed to the left, center, and right.
Figure 3B:
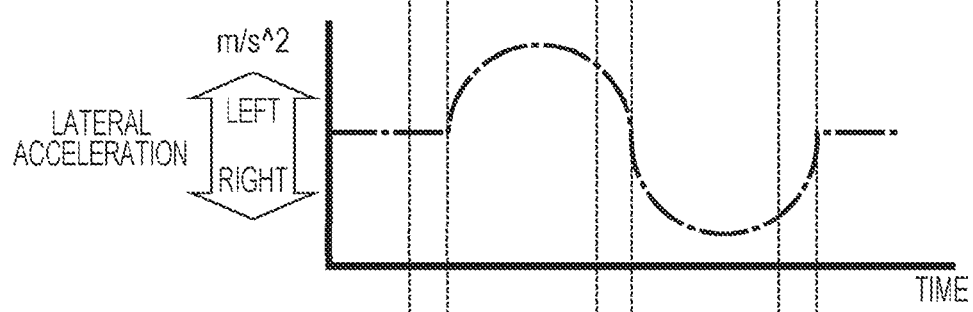
FIG. 3B is a graph showing a variation in a lateral acceleration applied to a vehicle over time in response to the steering angle in FIG. 3A.
Figure 3C:
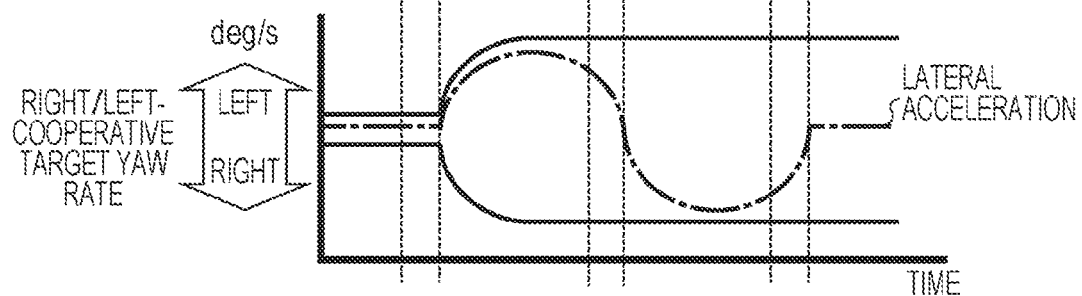
FIG. 3C is a graph showing a variation in a right-left cooperative target yaw rate over time in response to the lateral acceleration in FIG. 3B.
Figure 4A:
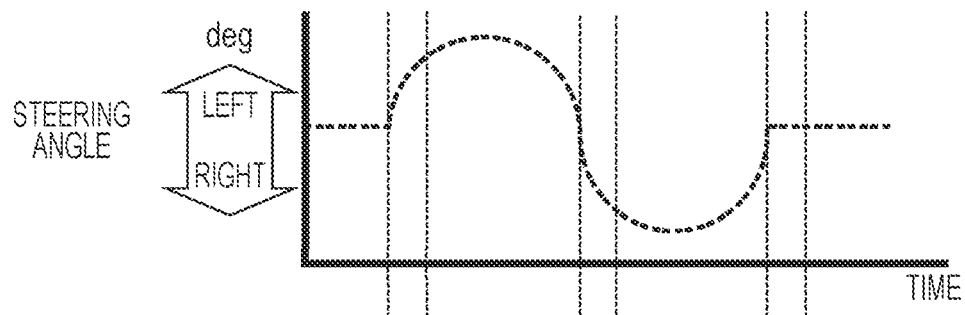
FIG. 4A is a graph showing a variation in a steering angle over time when a steering operation is sequentially performed to the left, center, and right.
Figure 4B:
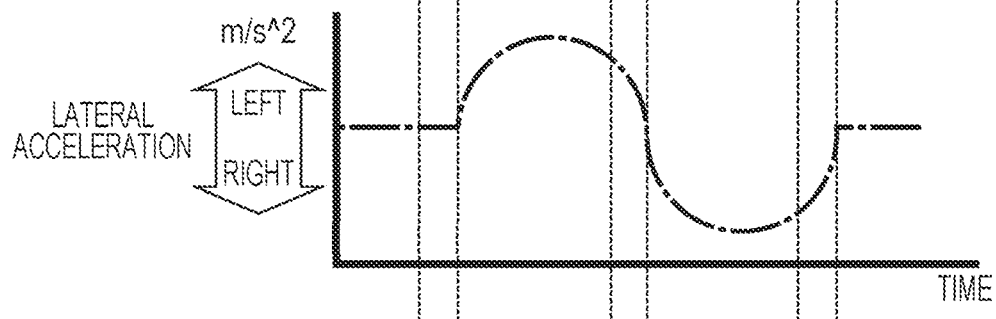
FIG. 4B is a graph showing a variation in a lateral acceleration applied to a vehicle over time in response to the steering angle in FIG. 3A.
Figure 4C:
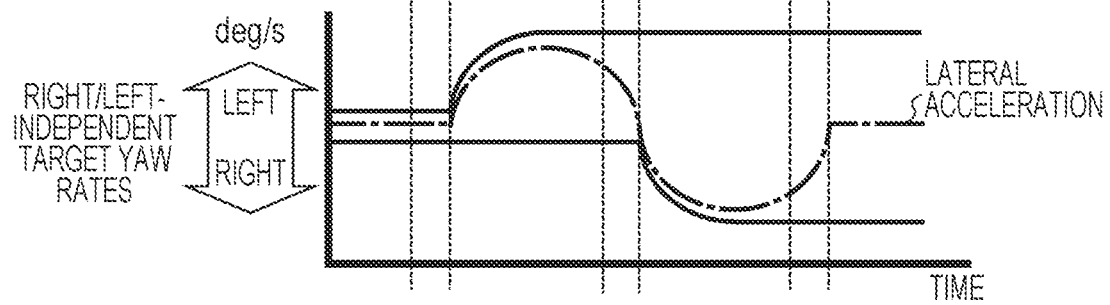
FIG. 4C is a graph showing variations in right-left independent target yaw rates with time in response to the lateral acceleration in FIG. 4B.

A function and effect of the vehicle behavior stability control apparatus 11 of the embodiment will be described with reference to FIGS. 3A to 3C and FIGS. 4A to 4C. FIG. 3A is a graph showing a variation in a steering angle over time when a steering operation is sequentially performed to the left, center, and right; FIG. 3B is a graph showing a variation in a lateral acceleration applied to a vehicle over time in response to the steering angle in FIG. 3A; and FIG. 3C is a graph showing a variation in a right-left cooperative target yaw rate over time in response to the lateral acceleration in FIG. 3B. FIG. 4A is a graph showing a variation in a steering angle over time when a steering operation is sequentially performed to the left, center, and right; FIG. 4B is a graph showing a variation in a lateral acceleration applied to a vehicle over time in response to the steering angle in FIG. 3A; and FIG. 4C is a graph showing variations in right-left independent target yaw rates with time in response to the lateral acceleration in FIG. 4B.

The vehicle behavior stability control apparatus 11 includes a yaw rate sensor (actual yaw rate detecting section) 21, a lateral acceleration sensor (lateral acceleration detecting section) 23, a vehicle speed sensor (vehicle speed detecting section) 25, an urgency determining section 31, a target yaw rate setting section 33, and an actuator control section (control section) 35.

If the urgency determining section 31 determines that an urgency with which a vehicle behavior is to be stabilized is equal to or lower than a determination criterion that indicates the necessity to stabilize a vehicle behavior urgently, the target yaw rate setting section 33 sets, as a target yaw rate, a right-left cooperative target yaw rate that is commonly applied to both the right cornering and left cornering. Otherwise, if the urgency determining section 31 determines that the urgency exceeds the determination criterion, the target yaw rate setting section 33 sets right-left independent target yaw rates that are independently applied to the right cornering and left cornering, respectively.

In a normal state where the urgency with which a vehicle behavior is to be stabilized is low (or lower than the determination criterion), the vehicle behavior stability control apparatus 11 sets a right-left cooperative target yaw rate that is commonly applied to both the right cornering and left cornering, as shown in FIGS. 3A to 3C. This makes the actuator control (or the vehicle behavior stability control) smooth, thereby suppressing a driver's unnatural feeling. In contrast, in an urgent state where the urgency with which a vehicle behavior is to be stabilized is high (or exceeds the determination criterion), the vehicle behavior stability control apparatus 11 sets right-left independent target yaw rates that are independently applied to the right cornering and left cornering, respectively, as shown in FIGS. 4A to 4C. This makes the actuator control (or the vehicle behavior stability control) speedy, thereby stabilizing the vehicle behavior swiftly.

Consequently, it is possible for the vehicle behavior stability control apparatus 11 to suppress an unnatural feeling that a driver has in a normal state and to stabilize a vehicle behavior in an urgent state, at a high level.

It is preferable for the target yaw rate setting section 33 to determine both the right-left cooperative target yaw rate and the right-left independent target yaw rates in preparation for the setting of the target yaw rate, independently of a result of determining the urgency with which a vehicle behavior is to be stabilized.

The above configuration enables the control modes of the actuator (e.g. the drive actuator 17 and the brake actuator 19) to be switched swiftly, even when the urgency with which the vehicle behavior is to be stabilized fluctuates rapidly.

It is preferable for the urgency determining section 31 to determine that the urgency with which the vehicle behavior is to be stabilized exceeds the determination criterion, when a steering angular velocity of the steering system is equal to or higher than a predetermined threshold and the control of the actuator (e.g. the drive actuator 17 and the brake actuator 19) is in execution.

The above configuration enables the actuator control section 35 to control the stability of the vehicle behavior at appropriate timing.

It is preferable that the right-left cooperative target yaw rate and the right-left independent target yaw rates each have a dead zone, and that the dead zone of either of the right-left independent target yaw rates be narrower than the dead zone of the right-left cooperative target yaw rate.

This configuration enables the actuator control section 35 to control the actuator (e.g. the drive actuator 17 and the brake actuator 19) swiftly, when the urgency with which the vehicle behavior is to be stabilized becomes high.

It is preferable that a control amount of the actuator (e.g. the drive actuator 17 and the brake actuator 19) when the right-left cooperative target yaw rate is switched to either of the right-left independent target yaw rates when the urgency with which the vehicle behavior is to be stabilized varies (increases) from the determination criterion or lower to higher than the determination criterion be larger than a control amount of the actuator when either of the right-left independent target yaw rates is switched to the right-left cooperative target yaw rate when the urgency with which the vehicle behavior is to be stabilized varies (decreases) from higher than the determination criterion to the determination criterion or lower. The control amount of the actuator (e.g. the drive actuator 17 and the brake actuator 19) refers to a control amount of a motor, pump, etc. that drives mechanical elements for supplying a vehicle with driving power or braking power.

This configuration enables the actuator control section 35 to control the actuator (e.g. the drive actuator 17 and the brake actuator 19) dynamically, when the right-left cooperative target yaw rate is switched to either of the right-left independent target yaw rates.

It is preferable that a control speed of the actuator (e.g. the drive actuator 17 and the brake actuator 19) when the right-left cooperative target yaw rate is switched to either of the right-left independent target yaw rates when the urgency with which the vehicle behavior is to be stabilized varies (increases) from the determination criterion or lower to higher than the determination criterion be faster than a control speed of the actuator when either of the right-left independent target yaw rates is switched to the right-left cooperative target yaw rate when the urgency with which the vehicle behavior is to be stabilized varies (decreases) from higher than the determination criterion to the determination criterion or lower.

This configuration enables the actuator control section 35 to control the actuator (e.g. the drive actuator 17 and the brake actuator 19) swiftly, when the right-left cooperative target yaw rate is switched to either of the right-left independent target yaw rates.

It is more preferable that the control amount and control speed of the actuator (e.g. the drive actuator 17 and the brake actuator 19) when the right-left cooperative target yaw rate is switched to either of the right-left independent target yaw rates when the urgency with which the vehicle behavior is to be stabilized varies (increases) from the determination criterion or lower to higher than the determination criterion be larger and faster than the control amount and control speed, respectively, of the actuator when either of the right-left independent target yaw rates is switched to the right-left cooperative target yaw rate when the urgency with which the vehicle behavior is to be stabilized varies (decreases) from higher than the determination criterion to the determination criterion or lower. This configuration enables the actuator control section 35 to control the actuator dynamically and swiftly, when the right-left cooperative target yaw rate is switched to either of the right-left independent target yaw rates.

Other Embodiments

It will be appreciated that the foregoing embodiment is an embodied example of the present disclosure. Accordingly, the present disclosure should not be interpreted such that its technical scope is limited. Various modifications can be made without departing from the spirit or primary characteristics of the disclosure.

In the foregoing embodiment, for example, the urgency determining section 31 determines that the urgency with which a vehicle behavior is to be stabilized exceeds a "determination criterion" when the steering angular velocity of the steering system is higher than a predetermined threshold and the control of the "actuator" (e.g. the drive actuator 17 and the brake actuator 19 herein) is in execution; however, the present disclosure is not limited to this example. Alternatively, for example, an obstacle sensor, such as a camera or a laser radar device, is provided at a front site of a vehicle, and if this obstacle sensor detects the presence of an obstacle, the urgency determining section 31 may determine that the urgency with which a vehicle behavior is to be stabilized exceeds a "determination criterion."

As in the foregoing embodiment, the target yaw rate setting section 33 determines both a right-left cooperative target yaw rate and right-left independent target yaw rates in preparation for the setting of a target yaw rate, independently of the result of determining the urgency with which a vehicle behavior is to be stabilized. In order to fulfill this function, for example, CPUs may be prepared to individually set a right-left cooperative target yaw rate and right-left independent target yaw rates and determine both yaw rates simultaneously.

As in the foregoing embodiment, the right-left cooperative target yaw rate and the right-left independent target yaw rates each have a dead zone, and the dead zone of each of the right-left independent target yaw rates is narrower than the dead zone of the right-left cooperative target yaw rate; however, the present disclosure is not limited to this example. Alternatively, the right-left cooperative target yaw rate may have a dead zone, but the right-left independent target yaw rates may have no dead zone. This aspect is included in the technical scope of the present disclosure.

As in the foregoing embodiment, the drive actuator 17 and the brake actuator 19 are used in combination as the "actuator," and the stability of a vehicle behavior is controlled through either or both of the drive control using the drive actuator 17 and the braking control using the brake actuator 19; however, the present disclosure is not limited to this example. Alternatively, the actuator control section 35 (control section) may control the distribution of torque to the wheels or the steering angle appropriately, in order to control the stability of a vehicle behavior.

We claim:
1. A vehicle behavior stability control apparatus comprising:
   an actual yaw rate detector detecting an actual yaw rate of a vehicle;
   a lateral acceleration detector detecting a lateral acceleration of the vehicle;
   a vehicle speed detector detecting a speed of the vehicle;
   an urgency determining section configured to determine a steering angular velocity of a steering system;
   a target yaw rate setting section configured to set a target yaw rate, on the basis of the lateral acceleration detected by the lateral acceleration detecting section and the vehicle speed detected by the vehicle speed detecting section; and
   a controller configured to control an actuator in such a way that the actual yaw rate detected by the actual yaw rate detecting section tracks the target yaw rate, the actuator adjusting a motion state of the vehicle,
   wherein if the urgency determining section determines that the steering angular velocity is equal to or lower than a predetermined threshold, the target yaw rate setting section sets a right-left cooperative target yaw rate as the target yaw rate, the right-left cooperative target yaw rate being a target yaw rate used for both right turn and left turn,
   wherein, if the urgency determining section determines that the steering angular velocity exceeds the predetermined threshold, the target yaw rate setting section sets right-left independent target yaw rates as the target yaw rate, the right-left independent target yaw rates being target yaw rates each independently applied to corresponding one of the right turn and left turn,
   wherein an operation amount of the actuator controlled by the controller is larger in a first case than in a second case,
   wherein the first case is a case in which the right-left cooperative target yaw rate is switched to either of the right-left independent target yaw rates when the steering angular velocity varies from equal to or lower than the predetermined threshold to higher than the predetermined threshold, and
   wherein the second case is a case in which either of the right-left independent target yaw rates is switched to the right-left cooperative target yaw rate when the steering angular velocity varies from higher than the predetermined threshold to equal to or lower than the predetermined threshold.

2. The vehicle behavior stability control apparatus according to claim 1, wherein
   the target yaw rate setting section determines both the right-left cooperative target yaw rate and the right-left independent target yaw rates in preparation for the setting, independently of a result of determination by the urgency determining section.

3. The vehicle behavior stability control apparatus according to claim 1, wherein
   when the steering angular velocity of the steering system exceeds the predetermined threshold and the control of the actuator is being performed, the target yaw rate setting section sets the right-left independent target yaw rates as the target yaw rate.

4. The vehicle behavior stability control apparatus according to claim 1, wherein
   a controlling speed at which the actuator is controlled is faster in the first case than in the second case.

5. A vehicle behavior stability control method comprising:
   a) detecting an actual yaw rate of a vehicle;
   b) detecting a lateral acceleration of the vehicle;
   c) detecting a speed of the vehicle;
   d) determining, using a processor, a steering angular velocity of a steering system;
   e) setting, using a processor, a target yaw rate, on the basis of the detected lateral acceleration and the detected vehicle speed; and
   f) controlling an actuator in such a way that the actual yaw rate tracks the target yaw rate, the actuator adjusting a motion state of the vehicle,
   wherein if the step d) determines that the steering angular velocity is equal to or lower than a predetermined threshold, the step e) sets a right-left cooperative target yaw rate as the target yaw rate, the right-left cooperative target yaw rate being a target yaw rate used for both right turn and left turn,
   wherein, if the step d) determines that the steering angular velocity exceeds the predetermined threshold, the step e) sets right-left independent target yaw rates as the target yaw rate, the right-left independent target yaw rates being target yaw rates each independently applied to corresponding one of the right turn and left turn,
   wherein an operation amount of the actuator controlled by the step (f) is larger in a first case than in a second case,
   wherein the first case is a case in which the right-left cooperative target yaw rate is switched to either of the right-left independent target yaw rates when the steering angular velocity varies from equal to or lower than the predetermined threshold to higher than the predetermined threshold, and
   wherein the second case is a case in which either of the right-left independent target yaw rates is switched to the right-left cooperative target yaw rate when the steering angular velocity varies from higher than the predetermined threshold to equal to or lower than the predetermined threshold.

6. A vehicle behavior stability control apparatus comprising:
- an actual yaw rate detector detecting an actual yaw rate of a vehicle;
- a lateral acceleration detector detecting a lateral acceleration of the vehicle;
- a vehicle speed detector detecting a speed of the vehicle;
- an urgency determining section configured to determine a steering angular velocity of a steering system;
- a target yaw rate setting section configured to set a target yaw rate, on the basis of the lateral acceleration detected by the lateral acceleration detecting section and the vehicle speed detected by the vehicle speed detecting section; and
- a controller configured to control an actuator in such a way that the actual yaw rate detected by the actual yaw rate detecting section tracks the target yaw rate, the actuator adjusting a motion state of the vehicle,
- wherein if the urgency determining section determines that the steering angular velocity is equal to or lower than a predetermined threshold, the target yaw rate setting section sets a right-left cooperative target yaw rate as the target yaw rate, the right-left cooperative target yaw rate being a target yaw rate used for both right turn and left turn,
- wherein, if the urgency determining section determines that the steering angular velocity exceeds the predetermined threshold, the target yaw rate setting section sets right-left independent target yaw rates as the target yaw rate, the right-left independent target yaw rates being target yaw rates each independently applied to corresponding one of the right turn and left turn,
- wherein a controlling speed at which the actuator is controlled is faster in a third case than in a fourth case,
- wherein the third case is a case in which the right-left cooperative target yaw rate is switched to either of the right-left independent target yaw rates when the steering angular velocity varies from equal to or lower than the predetermined threshold to higher than the predetermined threshold, and
- wherein the fourth case is a case in which either of the right-left independent target yaw rates is switched to the right-left cooperative target yaw rate when the steering angular velocity varies from higher than the predetermined threshold to equal to or lower than the predetermined threshold.

7. The vehicle behavior stability control apparatus according to claim 6, wherein
the target yaw rate setting section determines both the right-left cooperative target yaw rate and the right-left independent target yaw rates in preparation for the setting, independently of a result of determination by the urgency determining section.

8. The vehicle behavior stability control apparatus according to claim 6, wherein
when the steering angular velocity of the steering system exceeds the predetermined threshold and the control of the actuator is being performed, the target yaw rate setting section sets the right-left independent target yaw rates as the target yaw rate.

* * * * *